(12) United States Patent
Jiang

(10) Patent No.: US 12,739,820 B2
(45) Date of Patent: Sep. 15, 2026

(54) DATA TRANSMISSION METHOD AND APPARATUS, AND COMMUNICATION DEVICE

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 294 days.

(21) Appl. No.: 18/558,721

(22) PCT Filed: May 10, 2021

(86) PCT No.: PCT/CN2021/092881
§ 371 (c)(1),
(2) Date: Nov. 2, 2023

(87) PCT Pub. No.: WO2022/236629
PCT Pub. Date: Nov. 17, 2022

(65) Prior Publication Data

US 2024/0244611 A1 Jul. 18, 2024

(51) Int. Cl.

| | |
|---|---|
| ***H04W 72/1263*** | (2023.01) |
| ***H04L 1/1867*** | (2023.01) |
| ***H04W 72/23*** | (2023.01) |

(52) U.S. Cl.
CPC ....... *H04W 72/1263* (2013.01); *H04L 1/1893* (2013.01); *H04W 72/23* (2023.01)

(58) Field of Classification Search
CPC .. H04L 1/1893; H04W 72/1263; H04W 72/23
See application file for complete search history.

(56) References Cited

U.S. PATENT DOCUMENTS

| | | | | |
|---|---|---|---|---|
| 2021/0315049 | A1* | 10/2021 | Wei | H04W 76/27 |
| 2022/0256484 | A1* | 8/2022 | Xu | H04W 56/001 |
| 2023/0030443 | A1* | 2/2023 | Chen | H04W 72/23 |
| 2023/0319892 | A1* | 10/2023 | Zheng | H04W 28/0205 370/329 |
| 2023/0379815 | A1* | 11/2023 | Wang | H04W 48/20 |
| 2024/0080928 | A1* | 3/2024 | Yue | H04W 72/21 |

FOREIGN PATENT DOCUMENTS

WO WO 2021/083881 A1 5/2021

OTHER PUBLICATIONS

International Search Report and Written Opinion of International Application No. PCT/CN2021/092881, dated Feb. 11, 2022, 12 pages.

(Continued)

*Primary Examiner* — Brian P Cox
(74) *Attorney, Agent, or Firm* — Finnegan, Henderson, Farabow, Garrett & Dunner, L.L.P.

(57) ABSTRACT

A data transmission method is performed by a user equipment (UE), and includes: determining a current data transmission phase; and using one or more Configured Grant-Small Data Transmission (CG-SDT) resources in a CG SDT process according to the current data transmission phase.

19 Claims, 5 Drawing Sheets

(56) References Cited

OTHER PUBLICATIONS

Email discussion rapporteur (Samsung), "Report from email discussion [POST113-e][501][SDT] Selection criteria and overall Procedure", 3GPP RAN WG2 Meeting #113bis-e, R2-2102707, E-meeting, Apr. 12-20, 2021, 28 pages.
Asia Pacific Telecom, FGI, "CG-SDT based on beam operation", 3GPP TSG-RAN WG2 Meeting #113 bis electronic, R2-2103265, Online, Apr. 12-Apr. 20, 2021, 5 pages.
Qualcomm Incorporated, "Discussion on CG based NR small data transmission", 3GPP TSG-RAN WG2 Meeting #113 bis electronic, R2-2103434, Revision of R2-2101233, Online, Apr. 12-Apr. 20, 2021, 6 pages.
Extended European Search Report issued in Application No. 21933983.5 dated May 7, 2024, 13 pages.
"Retransmission issue of included in the CG email discussion", Beijing Xiaomi Mobile Software, 3GPP TSG-RAN WG2 Meeting #113 electronic, R2-2101676, E-Meeting, Jan. 25-Feb. 5, 2021, 5 pages.
Notice of the first review opinion issued by the Japanese Patent Office on Oct. 8, 2024, in corresponding Application No. JP 2023-569806, 6 pages.

* cited by examiner

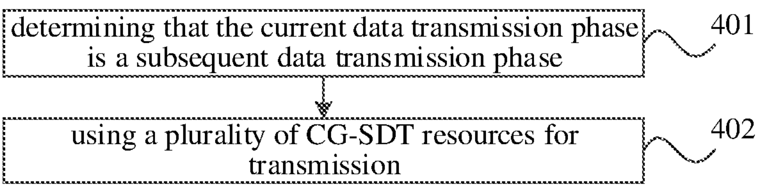

FIG. 6

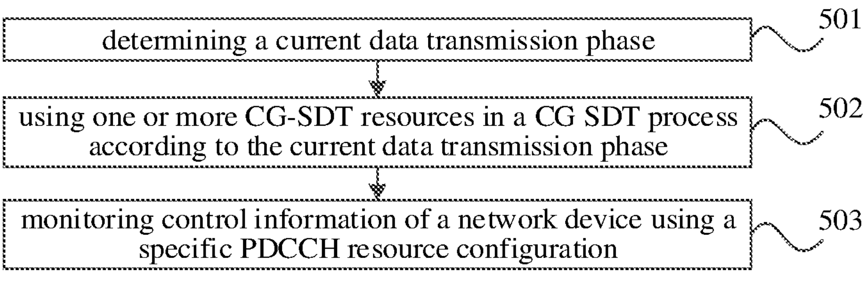

FIG. 7 determining a current data transmission phase
601
using one or more CG-SDT resources in a CG SDT process according to the current data transmission phase
602
determining that the current data transmission phase is a subsequent data transmission phase
603
monitoring control information of a network device using a specific PDCCH resource configuration
604

FIG. 8 sending at least one configured CG-SDT resource to a UE, the UE uses the at least one CG-SDT resource in a CG SDT process according to a current data transmission phase
701

FIG. 9

DATA TRANSMISSION METHOD AND APPARATUS, AND COMMUNICATION DEVICE

CROSS REFERENCE TO RELATED APPLICATIONS

This application a U.S. national phase of International Application No. PCT/CN2021/092881, filed on May 10, 2021, the entire contents of which are incorporated herein by reference.

TECHNICAL FIELD

The disclosure relates to a field of wireless communication technology, in particular to a data transmission method and apparatus, and a communication device.

BACKGROUND

For a CG-SDT (Configured Grant—Small Data Transmission) process, a network device can configure multiple periodic CG (Configured Grant) resources, which can correspond to different HARQ (Hybrid Automatic Repeat Request) processes. However, for a specific SDT (Small Data Transmission) process, which CG resource a UE (User Equipment) may use for data transmission with the network device is an issue to be addressed.

SUMMARY

A first aspect of the disclosure provides a data transmission method, which is performed by a use equipment (UE), and includes: determining a current data transmission phase; and using one or more Configured Grant—Small Data Transmission (CG-SDT) resources in a CG SDT process according to the current data transmission phase.

A second aspect of the disclosure provides a data transmission method, which is performed by a network device, and includes: sending at least one Configured Grant—Small Data Transmission (CG-SDT) resource to a user equipment (UE). The UE uses the at least one CG-SDT resource in a CG SDT process according to a current data transmission phase.

A third aspect of the disclosure provides a communication device, including: a transceiver, a memory, and a processor connected to the transceiver and the memory, respectively. The processor is configured to perform the data transmission method according to the first aspect of the disclosure or the data transmission method according to the second aspect of the disclosure.

A fourth aspect of the disclosure provides a non-transitory computer-readable storage medium having executable instructions stored thereon. When the executable instructions are executed by a processor, the data transmission method according to the first aspect of the disclosure or the data transmission method according to the second aspect of the disclosure is implemented.

BRIEF DESCRIPTION OF THE DRAWINGS

Example embodiments of the disclosure will be described in detail below with reference to the accompanying drawings, in which:

FIG. 6 is a flowchart of a data transmission method according to an embodiment of the disclosure;

FIG. 7 is a flowchart of a data transmission method according to an embodiment of the disclosure;

FIG. 8 is a flowchart of a data transmission method according to an embodiment of the disclosure;

FIG. 9 is a flowchart of a data transmission method according to an embodiment of the disclosure;

DETAILED DESCRIPTION

Figure 1:
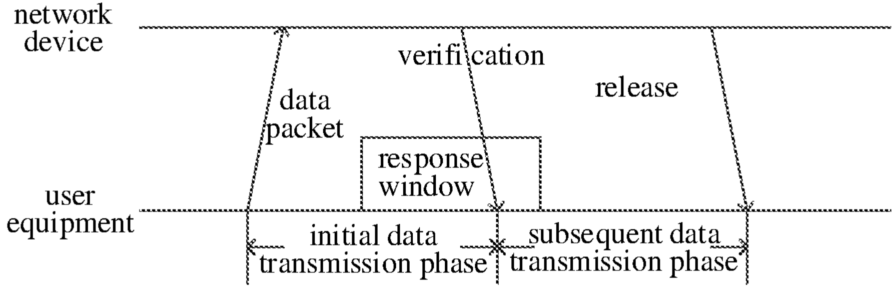
FIG. 1 is a schematic diagram of a SDT (Small Data Transmission) process according to an embodiment of the disclosure.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of the embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the disclosure. The singular forms of "a" and "the" used in the disclosure and the appended claims are also intended to include plural forms, unless the context clearly indicates other meanings. It should also be understood that the term "and/or" as used herein refers to and includes any or all possible combinations of one or more associated listed items.

It is understandable that although the terms "first", "second", and "third" may be used in the embodiments of the disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

The embodiments of the disclosure are described in detail below, and examples of which are illustrated in the accompanying drawings, in which the same or similar symbols indicate the same or similar elements. The embodiments described below with reference to the accompanying drawings are exemplary and are intended to be used to explain the disclosure and are not to be construed as a limitation of the disclosure.

Before explaining the embodiments of the disclosure in detail, commonly used technical terms are first introduced in order to facilitate understanding.

1. SDT (Small Data Transmission)

According to a resource configured by a network device, a user equipment (UE) can directly send data to the network device through the following methods when the UE is in an idle (IDLE)/inactive (INACTIVE) state.

The first method is an Msg3 of a 4-step random access process for initial access (or, referred to as 4-step RACH (random access channel) SDT).

The second method is an MsgA of a 2-step random access process for initial access (or, referred to as 2-step RACH SDT).

The third method is a dedicated uplink PUSCH (Physical Uplink Shared Channel) resource (i.e., a CG (Configured Grant) resource; or a PUR (Pre allocated Uplink Resource). configured by the network device, (or, referred to as CG SDT).

For example, the network device is a 5G base station (referred to as a gNB) in a 5G network architecture (the next generation system), and the SDT process can be as shown in FIG. 1. That is, the SDT process can include the following two phases.

Phase 1: an initial data transmission phase (Initial phase). This phase refers to a phase from a time point of triggering initial data transmission of the SDT to a time point of receiving acknowledgement information for the initial data from the network device.

The above acknowledgement information may differ for different SDT processes:

1) For the 4-step RACH SDT, the acknowledgement information is that a competitive resolution identifier for an Msg4 is successfully received.
2) For the 2-step RACH SDT, the acknowledgement information is that a competitive resolution identifier for an MsgB is successfully received.
3) For the CG SDT, the acknowledgement information is an indication of successful data reception sent by the network device (for example, the acknowledgement information may be ACK (Acknowledgement) information indicated by physical layer DCI (Downlink Control Information)).

Phase 2: a subsequent data transmission phase (Subsequent phase). This phase refers to a phase from the time point of receiving the acknowledgement information for the initial data from the network device to a time point of receiving a connection release message sent by the network device. At this phase, the UE can send and receive uplink and downlink data.

Figure 2:
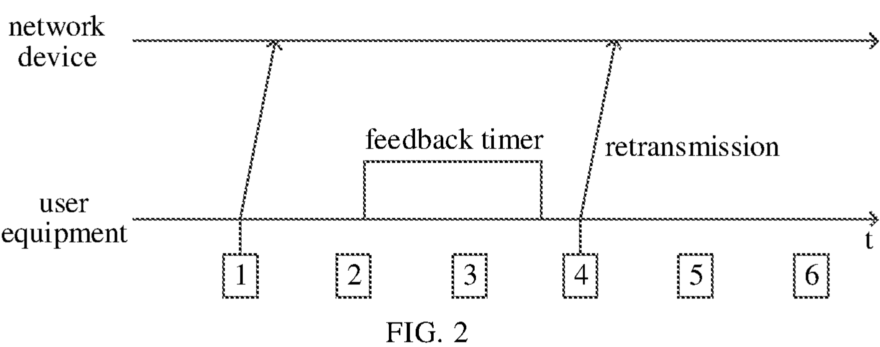
FIG. 2 is a schematic diagram of a CG-SDT (Configured Grant—Small Data Transmission) process according to an embodiment of the disclosure.

For example, the network device is a gNB, the CG-SDT process can be as shown in FIG. 2. For a CG-SDT resource configured by the network device, the UE may start a feedback timer to monitor feedback information from the network device after sending data using a CG resource (such as resource-1 in FIG. 2). If the UE does not receive an acknowledgement of successful reception sent by the network device during the operation of the feedback timer (such as a feedbackTimer), the UE may perform data retransmission in a subsequent CG resource (such as resource-4 in FIG. 2).

In the related art, for the CG-SDT process, the network device can configure multiple periodic CG resources, which may correspond to different HARQ (Hybrid Automatic Repeat Request) processes. For a specific SDT process, whether the multiple CG resources mentioned above can be used simultaneously and at which data transmission phase (i.e. the initial data transmission phase or the subsequent data transmission phase) of the SDT process the multiple CG resources mentioned above are used are problems to be addressed. At the same time, for the CG-SDT process, how to enable the network device to continuously perform dynamical scheduling (i.e., a physical downlink control channel (PDCCH) corresponding to an identifier of the UE) on the data transmission of the UE, to improve a data transmission rate of the UE, is also a problem to be solved.

To solve the above problems, the disclosure provides a data transmission method, a data transmission apparatus, and a communication device.

Figure 3:
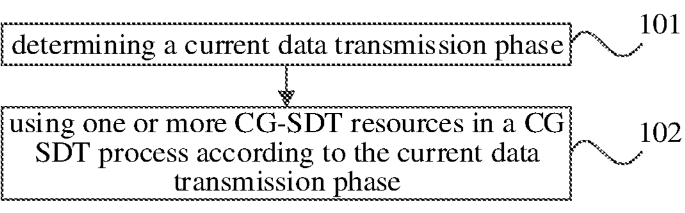
FIG. 3 is a flowchart of a data transmission method according to an embodiment of the disclosure.

FIG. 3 is a flowchart of a data transmission method provided in an embodiment of the disclosure. The data transmission method may be performed by a UE.

The UE can refer to a device that provides voice and/or data connectivity to a user, a handheld device with a wireless connectivity capability, or other processing devices connected to a wireless modem. A name of the UE may vary in different systems. A radio UE can communicate with one or more core networks (CN) through a RAN (Radio Access Network), and the radio UE can be a mobile terminal device such as a mobile phone (also known as a "cellular" phone) and a computer with a mobile terminal device, such as a portable, pocket, handheld, computer built-in or car mounted mobile device, which exchanges language and/or data with the radio access network.

For example, the UE can be a device such as a PCS (Personal Communication Service) phone, a cordless phone, a SIP (Session Initiated Protocol) phone, a WLL (Wireless Local Loop) station, a PDA (Personal Digital Assistant), etc. The radio UE can also be referred to as a system, a subscriber unit, a subscriber station, a mobile station, a mobile, a remote station, an access point, a remote terminal, an access terminal, a user terminal, a user agent, a user device, etc., which is not limited in the embodiments of the disclosure.

As shown in FIG. 3, the data transmission method may include the following steps. Step 101, a current data transmission phase is determined.

In an embodiment of the disclosure, the current data transmission phase may include an initial data transmission phase and a subsequent data transmission phase.

Step 102, one or more CG-SDT resources in a CG SDT process are used according to the current data transmission phase.

In an embodiment of the disclosure, a CG SDT resource is used for data transmission in the SDT process. The CG SDT resource can be configured by a network device. That is, the UE can receive the CG SDT resource configured by the network device.

For example, the network device is a base station. The base station may include multiple cells that provide services to the UE. Depending on the specific application situation, each cell may contain multiple TRPs (Transmission Reception Points or Transmit Receive Points). Each TRP may contain one or more antenna panels. Or, it can be a device in an access network that communicates with a wireless terminal device through one or more sectors on an air interface, or other names. For example, the base station referred to in embodiments of the disclosure may be a BTS (Base Transceiver Station) in GSM (Global System for Mobile Communication) or CDMA (Code Division Multiple Access), or a NodeB in WCDMA (Wide band Code Division Multiple Access). The base station may also be an evolved node B (eNB or e-NodeB) in an LTE (long term evolution) system, a 5G base station (gNB) in a 5G network architecture (next generation system), or a HeNB (Home Evolved Node B), a relay node, a femto, a pico, etc., which is not limited in the embodiments of the disclosure.

In an embodiment of the disclosure, the UE can use the at least one CG SDT resource in the CG SDT process according to the current data transmission phase. Therefore, the UE can use an appropriate CG SDT resource for data transmission according to the current data transmission phase, which can improve the data transmission rate of the UE, thus enabling the UE to send more data during the SDT process.

With the data transmission method according to the embodiment of the disclosure, the UE determines the current data transmission phase, and uses the at least one CG SDT resource in the CG SDT process according to the current data transmission phase. Therefore, the UE can use an appropriate CG SDT resource for data transmission according to the current data transmission phase, which can improve the data transmission rate of the UE, thus enabling the UE to send more data during the SDT process.

Figure 4:
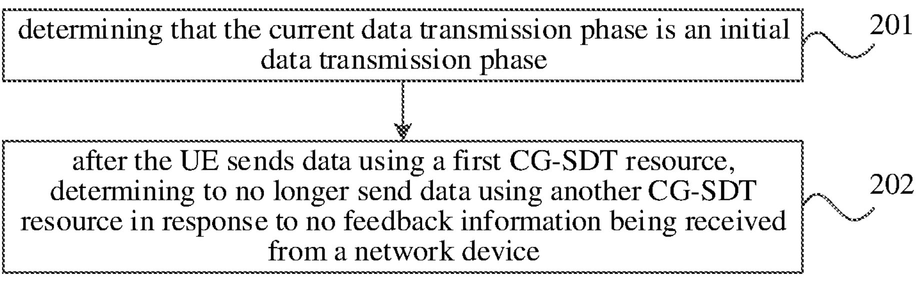
FIG. 4 is a flowchart of a data transmission method according to an embodiment of the disclosure.

An embodiment of the disclosure provide another data transmission method. FIG. 4 is a flowchart of a data transmission method provided by the embodiment of the disclosure. The data transmission method may be executed by a UE. The data transmission method may be executed separately, or in combination with any embodiment or a possible implementation of an embodiment of the disclosure, or in combination with any technical solution in the related art.

As shown in FIG. 4, the data transmission method may include the following steps.

Step 201, it is determined that a current data transmission phase is an initial data transmission phase.

In an embodiment of the disclosure, the UE may determine the current data transmission phase, and execution of subsequent steps may be triggered when the current data transmission phase is the initial data transmission phase.

Step 202, after the UE uses a first CG SDT resource to send data, the UE no longer use another CG SDT resource to send data in response to no feedback information being received from a network device.

In an embodiment of the disclosure, the first CG SDT resource and other CG SDT resources may be CG SDT resources configured by the network device.

As a possible implementation, the network device may configure at least one CG SDT resource for the UE through an RRC (Radio Resource Control) release message. Thus, the UE can receive the RRC release message sent by the network device, and determine the at least one CG SDT resource configured by the network device based on the RRC release message.

In an embodiment of the disclosure, the first CG SDT resource is a CG SDT resource used by the UE when CG SDT data transmission is triggered.

In an embodiment of the disclosure, at the initial data transmission phase, if the UE does not receive the feedback information from the network device after using the first CG SDT resource to send data, the UE may no longer use another CG SDT resource to send data. That is to say, at the initial data transmission phase, after triggering the data transmission, the UE no longer uses another CG SDT resource to send data until receiving the feedback information from the network device.

For example, the first CG SDT resource is a CG SDT resource corresponding to one of multiple HARQ processes in CG SDT resources corresponding to the multiple HARQ processes. For example, the CG SDT resources configured by the network device for the UE correspond to multiple HARQ processes. At the initial data transmission phase, after the UE selects one of the multiple HARQ processes for data transmission, the UE no longer uses another HARQ process to send data at the initial data transmission phase.

For example, as shown in FIG. 2, after the UE triggers the CG SDT data transmission (the data transmission may be an initial transmission of resource-1 or a retransmission of resource-4), the UE may start a feedback timer to monitor the feedback information from the network device. The UE cannot use another CG SDT resource to send data until the UE receives the feedback information from the network device. For example, the UE cannot use resource-2 or resource-3 to send data. In this way, it can avoid a failure of the network device in receiving subsequent data caused when the first data is not sent successfully and when the sending of the subsequent data does not carry an identifier for verifying the UE.

With the data transmission method according to the embodiments of the disclosure, the UE determines the current data transmission phase, and uses the one or more CG SDT resources in the CG SDT process according to the current data transmission phase. In this way, the UE can use an appropriate CG SDT resource for data transmission according to the current data transmission phase, which can improve the data transmission rate of the UE, thus enabling the UE to send more data during the SDT process.

It should be noted that the above possible implementations may be executed separately or in combination, which is not limited in the embodiments of the disclosure.

Figure 5:
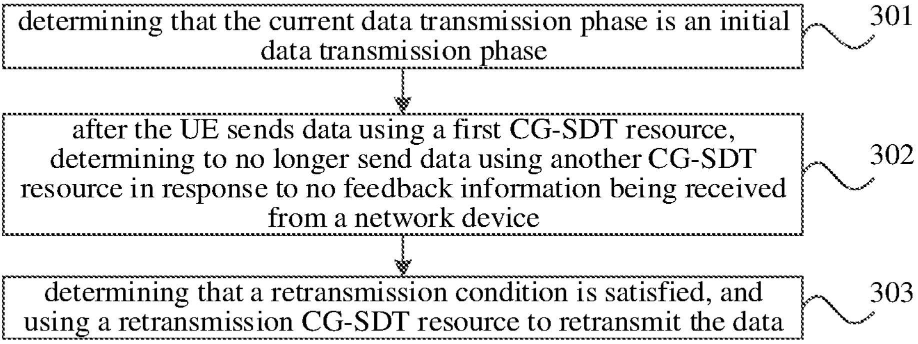
FIG. 5 is a flowchart of a data transmission method according to an embodiment of the disclosure.

An embodiment of the disclosure provides another data transmission method. FIG. 5 is a flowchart of a data transmission method provided by an embodiment of the disclosure. The data transmission method may be executed by a UE. The data transmission method may be executed separately, or in combination with any embodiment or a possible implementation of an embodiment of the disclosure, or in combination with any technical solution in the related art.

As shown in FIG. 5, the data transmission method may include the following steps.

Step 301, it is determined that a current data transmission phase is an initial data transmission phase.

Step 302, after the UE uses a first CG SDT resource to send data, the UE no longer use another CG SDT resource to send data in response to no feedback information being received from a network device.

In an embodiment of the disclosure, steps 301 to 302 can be implemented in any implementation in the various embodiments of the disclosure, respectively, which is not limited in the embodiments of the disclosure, and is not elaborated herein.

Step 303, a retransmission CG-SDT resource to is used to retransmit the data until it is determined that a retransmission condition is satisfied.

For example, the UE may start a feedback timer (such as feedbackTimer) to monitor the feedback information from the network device after using the first CG SDT resource to send data. If the UE does not receive the feedback information (such as successfully receiving confirmation information) sent by the network device during the operation of the feedback timer, the UE may determine that the retransmission condition is satisfied and may use the retransmission CG SDT resource to retransmit data.

For example, the first CG SDT resource may be resource-1 in FIG. 2, and the retransmission resource may be resource-4 in FIG. 2. After using the resource-1 to send data, the UE may start the feedback timer to monitor the feedback information from the network device. If the UE does not receive the feedback information (such as successfully receiving confirmation information) from the network device during the operation of the feedback timer, the UE may perform data retransmission in a subsequent CG SDT resource (i.e. resource-4).

With the data transmission method according to the embodiments of the disclosure, the UE determines the current data transmission phase, and uses the one or more CG SDT resources in the CG SDT process according to the current data transmission phase. Therefore, the UE may use an appropriate CG SDT resource for data transmission according to the current data transmission phase, which may improve the data transmission rate of the UE, thus enabling the UE to send more data during the SDT process.

It should be noted that the above possible implementations may be executed separately or in combination, which is not limited in the embodiment of the disclosure.

An embodiment of the disclosure provides another data transmission method. FIG. 6 is a flowchart of a data transmission method provided by an embodiment of the disclosure. The data transmission method may be executed by a UE. The data transmission method may be executed separately, or in combination with any embodiment or a possible implementation of an embodiment of the disclosure, or in combination with any technical solution in the related art.

As shown in FIG. 6, the data transmission method may include the following steps.

Step 401, it is determined that a current data transmission phase is a subsequent data transmission phase.

In an embodiment of the disclosure, the UE may determine the current data transmission phase, and execution of subsequent steps may be triggered when the current data transmission phase is the subsequent data transmission phase.

Step 402, a plurality of CG SDT resources are used for transmission.

In an embodiment of the disclosure, at the subsequent data transmission phase, the UE may use a plurality of CG SDT resources for transmission. For example, the UE may use multiple consecutive CG SDT resources for transmission, or the UE may continuously use multiple CG SDT resources for transmission.

For example, the CG SDT resources configured by a network device for the UE correspond to multiple HARQ processes. At the subsequent data transmission phase, the UE may use multiple HARQ processes to send data.

In a possible implementation of an embodiment of the disclosure, the plurality of CG SDT resources mentioned above may correspond to the same beam, or the plurality of consecutive CG SDT resources mentioned above may correspond to the same beam.

In another possible implementation of an embodiment of the disclosure, the plurality of CG SDT resources mentioned above may belong to the same CG SDT resource group, or the plurality of consecutive CG SDT resources mentioned above may belong to the same CG SDT resource group.

For example, the plurality of CG SDT resources or the plurality of consecutive CG SDT resources may be associated with the same downlink signal. For example, the network device configures a plurality of sets of CG SDT resources for the UE, and the plurality of sets of CG SDT resources correspond to different downlink signals (such as SSBs (Synchronous Signal Blocks)), respectively. Or, in one CG SDT resource sending cycle, there are a plurality of CG SDT resources (for example, the plurality of CG SDT resources correspond to CG SDT resource-1, CG SDT resource-2, CG SDT resource-3, and CG SDT resource-4, respectively), which correspond to different downlink signals (for example, CG SDT resource-1 corresponds to SSB-1, CG SDT resource-2 corresponds to SSB-2, CG SDT resource-3 corresponds to SSB-3, and CG SDT resource-4 corresponds to SSB-4), respectively. The CG SDT resources used by the UE in multiple resource sending cycles of the subsequent data transmission phase associate the same downlink signal.

In another possible implementation of an embodiment of the disclosure, the plurality of CG SDT resources mentioned above may correspond to the same beam as the CG SDT resource at the initial data transmission phase, or the plurality of consecutive CG SDT resources mentioned above may correspond to the same beam as the CG SDT resource at the initial data transmission phase.

In another possible implementation of an embodiment of the disclosure, the plurality of CG SDT resources mentioned above may belong to the same CG SDT resource group as the CG SDT resource at the initial data transmission phase, or the plurality of consecutive CG SDT resources mentioned above may belong to the same CG SDT resource group as the CG SDT resource at the initial data transmission phase.

For example, the downlink signals associated with the plurality of CG SDT resources or the plurality of consecutive CG SDT resources mentioned above may be the same as the downlink signal associated with the CG SDT resource used by the UE at the initial data transmission phase. For example, the network device configures multiple sets of CG SDT resources for the UE, which correspond to different downlink signals (such as SSBs), respectively. Or, in one CG SDT resource sending cycle, there are multiple CG SDT resources (for example, the multiple CG SDT resources correspond to CG SDT resource-1, CG SDT resource-2, CG SDT resource-3, and CG SDT resource-4, respectively), which correspond to different downlink signals (for example, CG SDT resource-1 corresponds to SSB-1, CG SDT resource-2 corresponds to SSB-2, CG SDT resource-3 corresponds to SSB-3, and CG SDT resource-4 corresponds to SSB-4), respectively. At the initial data transmission phase, the UE uses the CG SDT resource-1 associated with SSB-1 to send data, and at the subsequent data transmission phase, the UE also uses the CG SDT resource associated with SSB-1 to send data.

With the data transmission method according to the embodiments of the disclosure, the UE determines the current data transmission phase, and uses the one or more CG SDT resources in the CG SDT process according to the current data transmission phase. Therefore, the UE may use an appropriate CG SDT resource for data transmission according to the current data transmission phase, which may improve the data transmission rate of the UE, thus enabling the UE to send more data during the SDT process.

It should be noted that the above possible implementations may be executed separately or in combination, which is not limited in the embodiments of the disclosure.

An embodiment of the disclosure provides another data transmission method. FIG. 7 is a flowchart of a data transmission method provided by an embodiment of the disclosure. The data transmission method may be executed by a UE. The data transmission method may be executed separately, or in combination with any embodiment or a possible implementation of an embodiment of the disclosure, or in combination with any technical solution in the related art.

As shown in FIG. 7, the data transmission method may include the following steps.

Step 501, a current data transmission phase is determined.

Step 502, one or more CG SDT resources in the CG SDT process are used according to the current data transmission phase.

In an embodiment of the disclosure, steps 501 to 502 may be implemented in any implementation of the various embodiments of the disclosure, which is not limited in the embodiments of the disclosure, and is not elaborated herein.

Step 503, control information of a network device is monitored using a specific PDCCH resource configuration.

In an embodiment of the disclosure, the specific PDCCH resource may be configured by the network device.

As a possible implementation, the network device may configure the specific PDCCH resource through an RRC Release message.

As another possible implementation, the network device may configure the specific PDCCH resource through system information.

In an embodiment of the disclosure, whether at an initial data transmission phase or at a subsequent data transmission phase, the UE may use the specific PDCCH resource configuration to monitor the control information of the network device.

For example, at the current data transmission phase (which may be the initial data transmission phase or the subsequent data transmission phase), the UE may use the specific PDCCH resource configuration to monitor the control information of the network device. The control information is used to schedule the reception and sending of subsequent data.

With the data transmission method according to the embodiments of the disclosure, the UE determines the current data transmission phase, and uses the one or more CG SDT resources in the CG SDT process according to the current data transmission phase. Therefore, the UE may use an appropriate CG SDT resource for data transmission according to the current data transmission phase, which may improve the data transmission rate of the UE, thus enabling the UE to send more data during the SDT process.

It should be noted that the above possible implementation methods may be executed separately or in combination, which is not limited in the embodiments of the disclosure.

In any embodiment of the disclosure, the specific PDCCH resource includes at least one of the following aspects.

The first aspect is a specific resource identifier;

For example, the network device may configure a C-RNTI (Cell Radio Network Temporary Identifier) to a specific PDCCH resource through an RRC release message. If the C-RNTI is a specific resource identifier or a PDCCH resource identifier, the UE may use a PDCCH resource corresponding to the C-RNTI identifier as the specific PDCCH resource. Thus, the specific PDCCH resource may be used to monitor the control information of the network device.

The second aspect is a specific time domain resource configuration.

For example, the specific time domain resource configuration may be a specific search space configuration.

The third aspect is a specific frequency domain resource configuration.

For example, the specific frequency domain resource configuration may be a specific CORESET (Control Resource Set) configuration.

The fourth aspect is a PDCCH resource the same as a PDCCH resource corresponding to receiving feedback information from the network device at the initial data transmission phase.

That is, the specific PDCCH resource may be the same as the PDCCH resource corresponding to the feedback information received by the UE from the network device at the initial data transmission phase.

The fifth aspect is that a downlink signal associated with a specific PDCCH resource is the same as a downlink signal associated with a CG SDT resource used by the UE at the initial data transmission phase.

For example, a spatial relationship signal corresponding to the specific PDCCH resource is the same as the downlink signal associated with the CG SDT resource used by the UE at the initial data transmission phase. For example, the spatial relationship signal may be a signal corresponding to a TCI (Transmission Configuration Indication) state.

In any embodiment of the disclosure, an identifier of a downlink signal includes at least one of: an SSB identifier, or a CSI-RS (Channel State Information—Reference Signal) identifier.

An embodiment of the disclosure provides another data transmission method. FIG. 8 is a flowchart of a data transmission method provided by an embodiment of the disclosure. The data transmission method may be executed by a UE. The data transmission method may be executed separately, or in combination with any embodiment or a possible implementation of an embodiment of the disclosure, or in combination with any technical solution in the related art.

As shown in FIG. 8, the data transmission method may include the following steps.

Step 601, a current data transmission phase is determined.

Step 602, one or more CG SDT resources in the CG SDT process are used according to the current data transmission phase.

In an embodiment of the disclosure, steps 601 to 602 may be implemented in any implementation of the various embodiments of the disclosure, which is not limited in the embodiments of the disclosure, and is not elaborated herein.

Step 603, it is determined that the current data transmission phase is a subsequent data transmission phase.

Step 604, control information of a network device is monitored using a specific PDCCH resource configuration.

It should be noted that the explanation of the specific PDCCH resource in the previous embodiments is also applicable to this embodiment and will not be elaborated here.

In the embodiment of the disclosure, the UE may use the specific PDCCH resource configuration to monitor the control information of the network device at the subsequent data transmission phase.

For example, when the current data transmission phase is the subsequent data transmission phase, the UE may use the specific PDCCH resource configuration to monitor the control information of the network side. The control information is used to schedule the reception and sending of subsequent data.

With the data transmission method according to the embodiments of the disclosure, the UE determines the current data transmission phase, and uses the one or more CG SDT resource in the CG SDT process according to the current data transmission phase. Therefore, the UE may use an appropriate CG SDT resource for data transmission according to the current data transmission phase, which may improve the data transmission rate of the UE, thus enabling the UE to send more data during the SDT process.

It should be noted that the above possible implementations may be executed separately or in combination, which not limited in the embodiments of the disclosure.

In an embodiment of the disclosure, a scheduling mode and a dynamic scheduling mode of the one or more CG SDT resources of the CG SDT process may be controlled through a protocol agreement or a network device configuration. That is, the UE may distinguish different data transmission phases according to the configuration of the network device or the protocol agreement, and use the one or more CG SDT resources and/or a dynamically scheduled resource in the CG SDT process.

In an embodiment of the disclosure, the network device may configure, for the UE, a specific PDCCH resource used by the UE at the subsequent data transmission phase of the CG SDT process.

In an embodiment of the disclosure, the network device may configure at least one CG SDT resource for the UE. For example, the network device may configure the CG SDT resource for the UE through an RRC release message. The CG SDT resource is used for data transmission during the SDT process.

In an embodiment of the present disclosure, the UE may trigger the SDT process and select a CG SDT process for sending data.

In an embodiment of the disclosure, according to the configuration of the network device or the protocol agreement, the UE may perform data reception and sending according to any of the following rules.

Rule 1: at the initial data transmission phase, after triggering the data transmission, the UE cannot use another CG SDT resource to send data until receiving feedback information from the network device.

For example, the CG SDT resources configured for the UE by the network device correspond to multiple HARQ processes. At the initial data transmission phase, after the UE selects one of the HARQ processes for data transmission, the UE no longer uses another HARQ process to send data at the initial data transmission phase.

As shown in FIG. 2, the UE triggers the CG SDT data transmission, which may be an initial transmission of resource 1 or a retransmission of resource 4. Then the UE starts a feedback timer to monitor the feedback information from the network device. The UE cannot use another CG SDT resource, such as resource-2 or resource-3, for sending data until the UE receives the feedback information from the network device. In this way, it can avoid a reception failure of subsequent data caused when the first data is not sent successfully and when the sending of the subsequent data does not carry an identifier for verifying the UE.

Rule 2: at the subsequent data transmission phase, the UE may continuously use multiple CG SDT resources, or the UE may use multiple consecutive CG SDT resources.

For example, the CG SDT resources configured for the UE by the network device correspond to multiple HARQ processes. At the subsequent data transmission phase, the UE may use multiple HARQ processes to send data.

Rule 3: at the subsequent data transmission phase, the UE uses a specific PDCCH resource configuration to monitor control information of the network device.

For example, the network device configures the specific PDCCH resource for the UE in advance through an RRC release messages or system information. When the UE enters the subsequent data transmission phase, the UE may use this specific PDCCH resource configuration to monitor the control information of the network device. The control information may be used to schedule the reception and sending of the subsequent data.

In this way, the UE may continuously transmit uplink and/or downlink data using the one or more CG SDT resources and/or the dynamically scheduled resource (such as the specific PDCCH resource) at an appropriate data transmission phase during the CG SDT process, thereby supporting the UE to send more data during the SDT process.

An embodiment of the disclosure provides another data transmission method. FIG. 9 is a flowchart of a data transmission method provided by an embodiment of the disclosure. The data transmission method may be executed by a network device. The data transmission method may be executed separately, or in combination with any embodiment or a possible implementation of an embodiment of the disclosure, or in combination with any technical solution in the related art.

As shown in FIG. 9, the data transmission method may include the following steps.

Step 701, at least one configured CG SDT resource is sent to a UE. The UE uses the at least one CG SDT resource in a CG SDT process according to a current data transmission phase.

Optionally, in a possible implementation of an embodiment of the disclosure, the network device may send a first RRC release message to the UE. The at least one CG SDT resource is configured by the first RRC release message.

Optionally, in a possible implementation of an embodiment of the disclosure, the network device may send a configured specific PDCCH resource to the UE. The specific PDCCH resource is used to monitor control information of the network device.

Optionally, in a possible implementation of an embodiment of the disclosure, the network device may send a second RRC release message to the UE. The specific PDCCH resource is configured by the second RRC release message.

Optionally, in a possible implementation of an embodiment of the disclosure, the network device may send system information to the UE. The specific PDCCH resource is configured by the system information.

It should be noted that the explanation of the method executed by the UE in any of the embodiments shown in FIG. 3 to FIG. 8 also applies to the method executed by the network device in this embodiment. The implementation principle is similar and will not be elaborated here.

With the data transmission method according to the embodiments of the disclosure, the network device sends the at least one configured CG SDT resource to the UE. The UE uses the at least one CG SDT resource in the CG SDT process according to the current data transmission phase. Therefore, the UE may use an appropriate CG SDT resource for data transmission according to the current data transmission phase, which can improve the data transmission rate of the UE, thus enabling the UE to send more data during the SDT process.

It should be noted that the above possible implementations may be executed separately or in combination, which is not limited in the embodiments of the disclosure.

Correspondingly to the data transmission method provided in the embodiments of FIG. 3 to FIG. 8 above, the disclosure also provides a data transmission apparatus. As the data transmission apparatus provided in the embodiments of the disclosure corresponds to the data transmission method provided in the embodiments of FIG. 3 to FIG. 8 above, the implementation of the data transmission method is also applicable to the data transmission apparatus provided in the embodiments of the disclosure, which is not elaborated herein.

Figure 10:
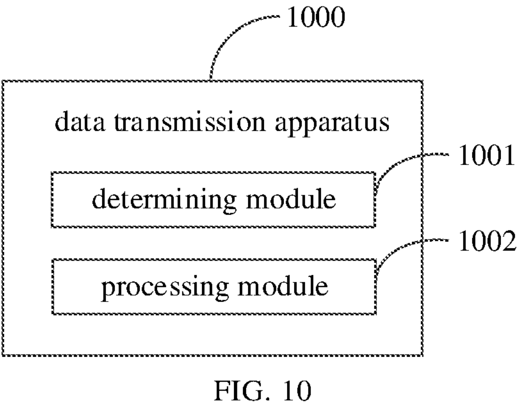
FIG. 10 is a block diagram of a data transmission apparatus according to an embodiment of the disclosure.

FIG. 10 is a block diagram of a data transmission apparatus according to an embodiment of the disclosure. The data transmission apparatus may be applied to a UE.

As illustrated in FIG. 10, the data transmission apparatus 1000 includes: a determining module 1001 and a processing module 1002.

The determining module 1001 is configured to determine a current data transmission phase.

The processing module 1002 is configured to use one or more Configured Grant Small Data Transmission (CG-SDT) resources in a CG SDT process according to the current data transmission phase.

Optionally, the data transmission apparatus 1000 may further include:

a receiving module, configured to receive at least one CG-SDT resource configured by a network device.

Optionally, the at least one CG-SDT resource is configured by a radio resource control (RRC) release message.

Optionally, the processing module 1002 is configured to: determine that the current data transmission phase is an initial data transmission phase; and after the UE sends data using a first CG-SDT resource, determine to no longer send data using another CG-SDT resource in response to no feedback information being received from a network device.

Optionally, the processing module 1002 is configured to: determine that a retransmission condition is satisfied, and use a retransmission CG-SDT resource to retransmit the data.

Optionally, the processing module 1002 is configured to: determine that the current data transmission phase is a subsequent data transmission phase; and use a plurality of CG-SDT resources for transmission.

Optionally, the plurality of CG-SDT resources correspond to the same beam, or the plurality of CG-SDT resources belong to the same CG-SDT resource group.

Optionally, the plurality of CG-SDT resources correspond the same beam as a CG-SDT resource at an initial data transmission phase, or the plurality of CG-SDT resources belong to the same CG-SDT resource group as the CG-SDT resource at the initial data transmission phase.

Optionally, the processing module 1002 is configured to: monitor control information of a network device using a specific physical downlink control channel (PDCCH) resource configuration.

Optionally, the processing module 1002 is configured to: determine that the current data transmission phase is a subsequent data transmission phase; and monitor control information of a network device using a specific PDCCH resource configuration.

Optionally, the specific PDCCH resource is configured by the network device.

Optionally, the specific PDCCH resource includes at least one of: a specific resource identifier; a specific time domain resource configuration; a specific frequency domain resource configuration; a PDCCH resource the same as a PDCCH resource corresponding to receiving feedback information from the network device at an initial data transmission phase; or a downlink signal associated with the specific PDCCH resource being the same as a downlink signal associated with a CG SDT resource used by the UE at the initial data transmission phase.

With the data transmission apparatus according to the embodiments of the disclosure, the UE determines the current data transmission phase, and uses the one or more CG SDT resource in the CG SDT process according to the current data transmission phase. Therefore, the UE can use an appropriate CG SDT resource for data transmission according to the current data transmission phase, which can improve the data transmission rate of the UE, thus enabling the UE to send more data during the SDT process.

Correspondingly to the data transmission method provided in the embodiments of FIG. 9 above, the disclosure also provides a data transmission apparatus. As the data transmission apparatus provided in the embodiments of the disclosure corresponds to the data transmission method provided in the embodiments of FIG. 9 above, the implementation of the data transmission method is also applicable to the data transmission apparatus provided in the embodiments of the disclosure, which is not elaborated herein.

Figure 11:
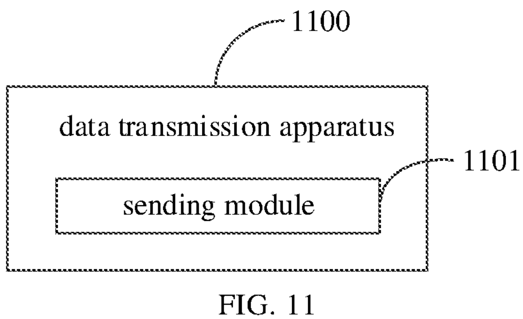
FIG. 11 is a block diagram of a data transmission apparatus according to an embodiment of the disclosure.

FIG. 11 is a block diagram of a data transmission apparatus according to an embodiment of the disclosure. The data transmission apparatus is applied to a network device.

The data transmission apparatus 1100 includes: a sending module 1101.

The sending module 1101 is configured to send at least one configured CG-SDT resource to a user equipment (UE). The UE uses the at least one CG-SDT resource in a CG SDT process according to a current data transmission phase.

Optionally, the sending module 1101 is configured to: send a first radio resource control (RRC) release message to the UE. The at least one CG-SDT resource is configured by the first RRC release message.

Optionally, the sending module 1101 is configured to: send a configured specific physical downlink control channel (PDCCH) resource to the UE. The specific PDCCH resource is configured to monitor control information of the network device.

Optionally, the sending module 1101 is configured to: send a second RRC release message to the UE. The specific PDCCH resource is configured by the second RRC release message.

Optionally, the sending module 1101 is configured to: send system information to the UE. The specific PDCCH resource is configured by the system information.

With the data transmission apparatus according to the embodiments of the disclosure, the network device sends the at least one configured CG SDT resource to the UE. The UE uses the at least one CG SDT resource in the CG SDT process according to the current data transmission phase. Therefore, the UE may use an appropriate CG SDT resource for data transmission according to the current data transmission phase, which can improve the data transmission rate of the UE, thus enabling the UE to send more data during the SDT process.

In order to realize the above embodiments, the disclosure also provides a communication device.

The communication device provided by the embodiments of the disclosure includes a processor, a transceiver, a memory, and executable programs stored on the memory and capable of being run by the processor. When the executable programs are run by the processor, the above method is implemented.

The communication device may be the UE or the network device as described above.

The processor may include various types of storage mediums that are non-transitory computer storage mediums capable of continuing to memorize information stored thereon after the communication device is powered down. The communication device includes a UE or a network device.

The processor may be connected to the memory via a bus, for reading the executable programs stored on the memory, as shown in at least one of FIGS. 3 to 9.

In order to realize the above embodiments, the disclosure also provides a computer storage medium.

The computer storage medium provided by the embodiments of the disclosure has executable programs stored thereon. When the executable programs are executed by a processor, the method of any of the above embodiments is implemented, as shown in at least one of FIGS. 3 to 9.

Figure 12:
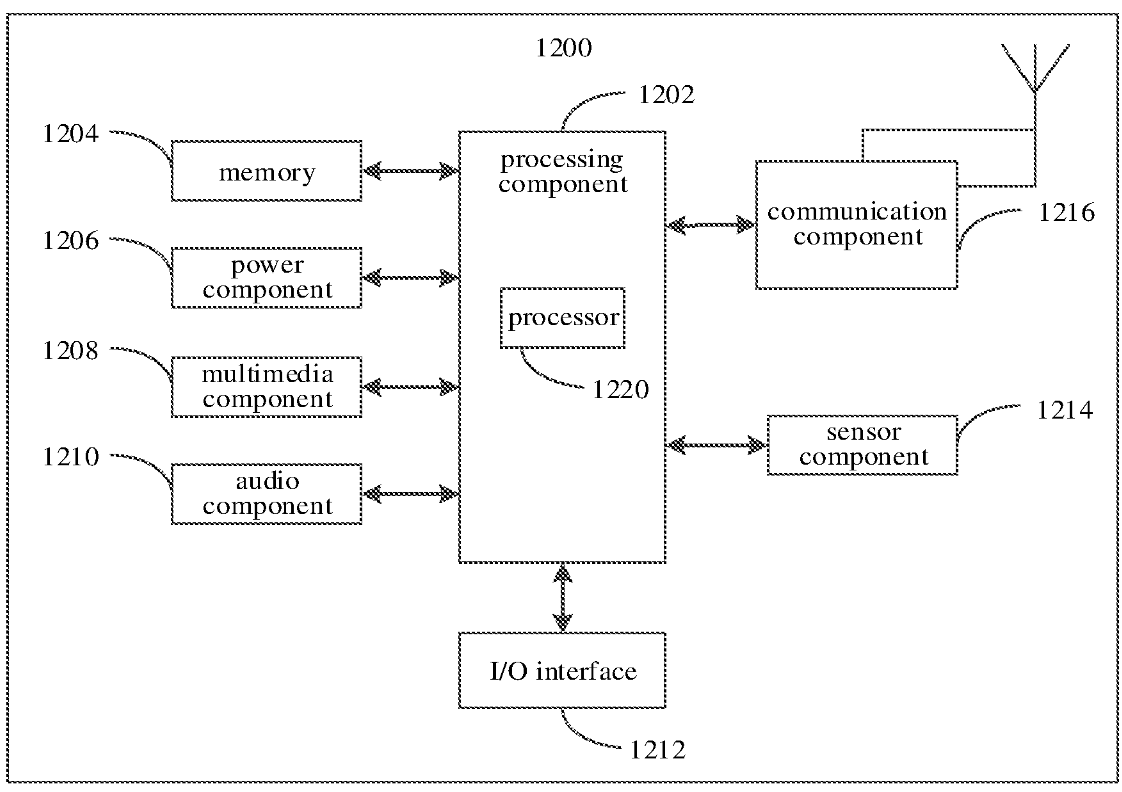
FIG. 12 is a block diagram of a use equipment (UE) according to an embodiment of the disclosure.

FIG. 12 is a block diagram of a UE 1200 provided by an embodiment of the disclosure. For example, the UE 1200 may be a mobile phone, a computer, a digital broadcasting UE, a message transceiver device, a game console, a tablet device, a medical device, a fitness device, and a personal digital assistant.

As illustrated in FIG. 12, the UE 1200 may include at least one of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the UE 1200, such as the operations associated with display, telephone calls, data communications, camera operations, and recording operations. The processing component 1202 may include at least one processor 1220 to perform all or part of the steps in the above described methods. Moreover, the processing component 1202 may include at least one module which facilitate the interaction between the processing component 1202 and other components. For example, the processing component 1202 may include a multimedia module to facilitate the interaction between the multimedia component 1208 and the processing component 1202.

The memory 1204 is configured to store various types of data to support the operation of the UE 1200. Examples of such data include instructions for any applications or methods operated on the UE 1200, contact data, phonebook data, messages, pictures, videos, etc. The memory 1204 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic or optical disk.

The power component 1206 provides power to various components of the UE 1200. The power component 1206 may include a power management system, at least one power source, and any other components associated with the generation, management, and distribution of power in the UE 1200.

The multimedia component 1208 includes a screen providing an output interface between the UE 1200 and the user. In some embodiments, the screen may include a Liquid Crystal Display (LCD) and a Touch Panel (TP). If the screen includes the touch panel, the screen may be implemented as a touch screen to receive input signals from the user. The touch panel includes at least one touch sensor to sense touches, swipes, and gestures on the touch panel. The touch sensor may not only sense a boundary of a touch or swipe action, but also sense a period of wakeup time and a pressure associated with the touch or swipe action. In some embodiments, the multimedia component 1208 includes a front-facing camera and/or a rear-facing camera. When the UE 1200 is in an operating mode, such as a shooting mode or a video mode, the front-facing camera and/or the rear-facing camera can receive external multimedia data. Each of the front-facing camera and the rear-facing camera may be a fixed optical lens system or has focal length and optical zoom capability.

The audio component 1210 is configured to output and/or input audio signals. For example, the audio component 1210 includes a microphone (MIC) configured to receive an external audio signal when the UE 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1214 includes at least one sensor to provide status assessments of various aspects of the UE 1200. For instance, the sensor component 1214 may detect an open/closed status of the UE 1200, relative positioning of components, e.g., the display and the keypad, of the UE 1200, a change in position of the UE 1200 or a component of the UE 1200, a presence or absence of a user contact with the UE 1200, an orientation or an acceleration/deceleration of the UE 1200, and a change in temperature of the UE 1200. The sensor component 1214 may include a proximity sensor configured to detect the presence of nearby objects without any physical contact. The sensor component 1214 may also include a light sensor, such as a Complementary Metal Oxide Semiconductor (CMOS) or Charge-Coupled Device (CCD) image sensor, for using in imaging applications. In some embodiments, the sensor component 1214 may also include an accelerometer sensor, a gyroscope sensor, a magnetic sensor, a pressure sensor, or a temperature sensor.

The communication component 1216 is configured to facilitate communication, wired or wirelessly, between the UE 1200 and other devices. The UE 1200 can access a wireless network based on a communication standard, such as Wi-Fi, 2G or 3G, or a combination thereof. In an embodiment, the communication component 1216 receives a broadcast signal from an external broadcast management system or broadcast associated information via a broadcast channel. In an embodiment, the communication component 1216 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the embodiments, the UE 1200 may be implemented by at least one Application Specific Integrated Circuit (ASIC), Digital Signal Processor (DSP), Digital Signal Processing Device (DSPD), Programmable Logic Device (PLD), Field Programmable Gate Array (FPGA), controller, micro-controller, microprocessor or other electronic components, for performing the above described methods as illustrated in any of FIG. 3 to FIG. 8.

In the embodiments, there is also provided a non-transitory computer readable storage medium including instructions, such as the memory 1204, executable by the processor 1220 in the UE 1200, for performing the above method of any of FIG. 3 to FIG. 8. For example, the non-transitory computer-readable storage medium may be a ROM, a Random Access Memory (RAM), a CD-ROM, a magnetic tape, a floppy disc, and an optical data storage device.

Figure 13:
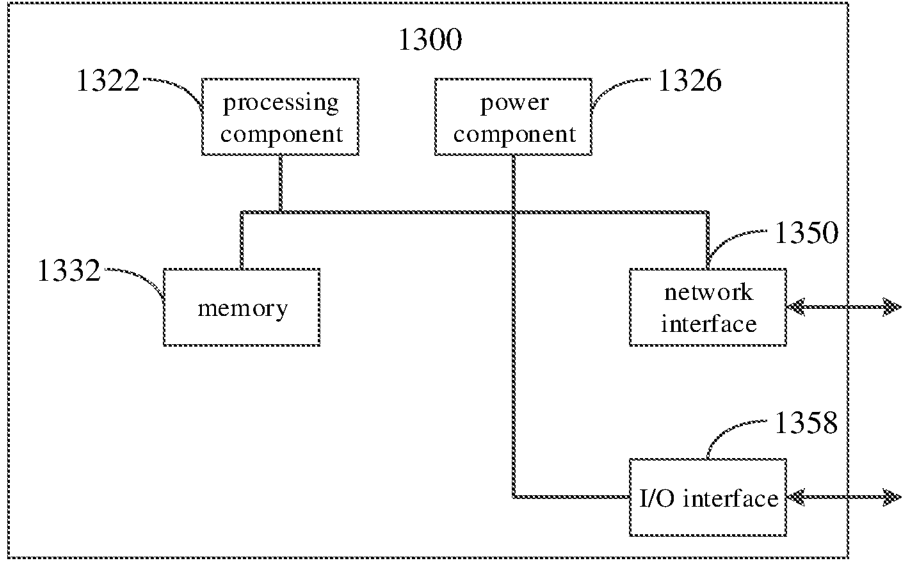
FIG. 13 is a block diagram of a network device according to an embodiment of the disclosure.

FIG. 13 is a schematic diagram of a network device provided by an embodiment of the disclosure. As illustrated in FIG. 13, a network device 1300 includes a processing component 1322 consisting of at least one processor, and memory resources represented by a memory 1332 for storing instructions executable by the processing component 1322, such as applications. The applications stored in the memory 1332 may include one or more modules each corresponding to a set of instructions. In addition, the processing component 1322 is configured to execute the instructions to perform any of the methods described above that are performed by the network device, for example, the method shown in FIG. 9.

The network device 1300 may also include a power component 1326 configured to perform power management of the network device 1300, a wired or wireless network interface 1350 configured to connect the network device 1300 to a network, and an input-output (I/O) interface 1358. The network device 1300 may operate based on an operating system stored in the memory 1332, such as Windows Server™, Mac OS X™, Unix™, Linux™, FreeBSD™, or the like.

Other implementations of the disclosure will be apparent to those skilled in the art from consideration of the specification and practice of the disclosure disclosed here. This disclosure is intended to cover any variations, usages, or adaptations of the disclosure following the general principles thereof and including such departures from the disclosure as come within known or customary practice in the art. It is intended that the specification and examples are considered as illustrative only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A data transmission method, performed by a user equipment (UE), comprising:

determining a current data transmission phase; and using one or more Configured Grant-Small Data Transmission (CG-SDT) resources in a CG SDT process according to the current data transmission phase, wherein the current data transmission phase is an initial data transmission phase, and using the one or more CG-SDT resources in the CG SDT process according to the current data transmission phase comprises:

after the UE sends data using a first CG-SDT resource, determining to no longer send data using another CG-SDT resource in response to no feedback information being received from a network device.

2. The method of claim 1, further comprising:

receiving at least one CG-SDT resource configured by a network device.

3. The method of claim 2, wherein the at least one CG-SDT resource is configured by a radio resource control (RRC) release message.

4. The method of claim 1, further comprising:

determining that a retransmission condition is satisfied, and using a retransmission CG-SDT resource to retransmit the data.

5. The method of claim 1, wherein the current data transmission phase is a subsequent data transmission phase, and using the one or more CG-SDT resources in the CG SDT process according to the current data transmission phase comprises:

using a plurality of CG-SDT resources for transmission.

6. The method of claim 5, wherein the plurality of CG-SDT resources correspond to the same beam, or the plurality of CG-SDT resources belong to the same CG-SDT resource group.

7. The method of claim 5, wherein the plurality of CG-SDT resources correspond the same beam as a CG-SDT resource used at an initial data transmission phase, or the plurality of CG-SDT resources belong to the same CG-SDT resource group as the CG-SDT resource used at the initial data transmission phase.

8. The method of claim 1, further comprising:

monitoring control information of a network device using a specific physical downlink control channel (PDCCH) resource.

9. The method of claim 8, wherein the specific PDCCH resource is configured by the network device.

10. The method of claim 8, wherein the specific PDCCH resource comprises at least one of:

a specific resource identifier;

a specific time domain resource configuration;

a specific frequency domain resource configuration;

a PDCCH resource the same as a PDCCH resource for receiving feedback information from the network device at an initial data transmission phase; or a downlink signal associated with the specific PDCCH resource being the same as a downlink signal associated with a CG SDT resource used by the UE at the initial data transmission phase.

11. The method of claim 1, further comprising:

determining that the current data transmission phase is a subsequent data transmission phase; and monitoring control information of a network device using a specific PDCCH resource.

12. A non-transitory computer-readable storage medium having computer-executable instructions stored thereon that, when executed by a processor of a user equipment, cause the user equipment to perform the data transmission method of claim 1.

13. A data transmission method, performed by a network device, comprising:

sending at least one Configured Grant-Small Data Transmission (CG-SDT) resource to a user equipment (UE);

wherein the UE uses the at least one CG-SDT resource in a CG SDT process according to a current data transmission phase, and wherein the current data transmission phase is an initial data transmission phase, the at least one CG-SDT resource are configured for the UE to:

after the UE sends data using a first CG-SDT resource, determining to no longer send data using another CG-SDT resource in response to no feedback information being received from a network device.

14. The method of claim 13, wherein the at least one CG-SDT resource is configured for the UE to determine that a retransmission condition is satisfied and use a retransmission CG-SDT resource to retransmit the data.

15. The method of claim 13, further comprising:

sending a configured specific physical downlink control channel (PDCCH) resource to the UE, wherein the specific PDCCH resource is configured to monitor control information of the network device.

16. The method of claim 15, wherein sending the configured specific PDCCH resource to the UE comprises:

sending a second RRC release message to the UE, wherein the specific PDCCH resource is configured by the second RRC release message.

17. The method of claim 15, wherein sending the configured specific PDCCH resource to the UE comprises:

sending system information to the UE, wherein the specific PDCCH resource is configured by the system information.

18. A network device, comprising:

a transceiver;

a memory; and a processor connected to the transceiver and the memory, respectively, wherein the processor is configured to perform the data transmission method of claim 13.

19. A user equipment, comprising:

a transceiver;

a memory; and a processor connected to the transceiver and the memory, respectively, wherein the processor is configured to:

determine a current data transmission phase; and use one or more Configured Grant-Small Data Transmission (CG-SDT) resources in a CG SDT process according to the current data transmission phase, wherein the current data transmission phase is an initial data transmission phase, and the processor is configured to:

after the UE sends data using a first CG-SDT resource, determine to no longer send data using another CG-SDT resource in response to no feedback information being received from a network device.

* * * * *